July 18, 1961     K. F. BURROWS     2,992,667
MEAT GRIP
Filed June 8, 1959
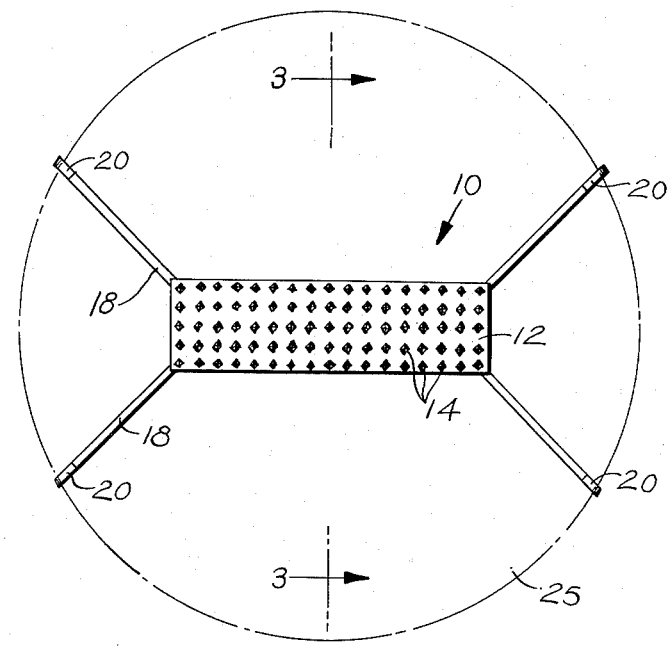
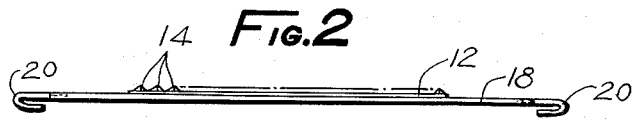
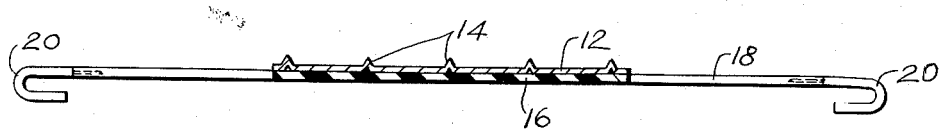
INVENTOR.
Kathryn Burrows

United States Patent Office 2,992,667
Patented July 18, 1961

2,992,667
MEAT GRIP
Kathryn F. Burrows, Rte. 1, Corry, Pa.
Filed June 8, 1959, Ser. No. 818,943
2 Claims. (Cl. 146—216)

This invention relates to food serving equipment and more particularly to a serving aid for meat.

It is an object of the present invention to provide a gripping device for securely supporting a cut of meat upon a plate or other flat surface for serving, cutting, and trimming purposes.

Still another object of the present invention is to provide a meat serving aid for gripping meat of the above type that can be conveniently placed upon and removed from any desired serving piece, and which can be readily cleaned after each use.

Other objects of the invention are to provide a meat grip bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a top plan view of a meat grip device made in accordance with the present invention;

FIGURE 2 is a side elevational view of the device shown in FIGURE 1, removed from the plate; and FIGURE 3 is an enlarged transverse cross sectional view taken along line 3—3 of FIGURE 1.

Referring now more in detail to the drawing, a serving aid 10 for gripping meat made in accordance with the present invention is shown to include a substantially rectangular mounting plate 12 having a plurality of upwardly projecting protuberances 14 which may be pointed at their uppermost ends for biting engagement with the bottom surface of a cut of meat placed thereupon.

The mounting plate 12 is secured to the central web 16 of a flexible layer of elastic material having a pair of elastic strips 18 extending diagonally outwardly from each longitudinal extremity of the web 16. The outermost end of each such elastic strip 18 is provided with an inwardly opening hook element 20 of rigid construction, for releasable engagement with circumferentially spaced apart peripheral portions of a serving plate or tray 25.

It will now be recognized that by utilizing the elastic strips 18 and rigid hooks 20, that the meat gripping device 10 can be conveniently placed upon any serving tray. Thus, when the meat is placed upon the protuberances 14 of the mounting plate 12, it will be held securely for all trimming, cutting, and serving operations.

While various changes may be made in the detail construction, it shall be understood that such changes shall be within the spirit and scope of the present invention as defined by the appended claims.

What I claim as new and desire to protect by Letters Patent of the United States is:

1. A serving aid for gripping a cut of meat upon a flat surface comprising, in combination, a rigid mounting plate, releasable securement means detachably positioning said mounting plate upon a serving plate, meat gripping means carried upon said mounting plate for limiting the movement of a cut of meat along the surface thereof, said mounting plate comprising a substantially rectangular metallic plate of uniform cross sectional configuration having substantially straight sides, said gripping means comprising a plurality of upwardly projecting pointed protuberances for engagement with the bottom surface of the cut of meat placed thereupon, and said securement means comprising a plurality of outwardly extending elastic strips converging toward said mounting plate and engageable with a supporting structure for positioning said mounting plate centrally thereupon, said elastic strips tending to maintain said mounting plate in said centered position, said securement means further comprising a substantially rectangular web of flexible material, said web of flexible material being of substantially the same size and shape as said mounting plate, and each of said elastic strips having one end secured to each diagonal extremity of said web.

2. The combination according to claim 1, further comprising a substantially rigid hook element integral with the free end of each one of said elastic strips for slidably receiving circumferentially spaced apart peripheral portions of a serving tray.

References Cited in the file of this patent

UNITED STATES PATENTS

| | | |
|---|---|---|
| 361,742 | Bennett | Apr. 26, 1887 |
| 877,331 | Haverstick | Jan. 21, 1908 |
| 1,205,774 | Mitchell | Nov. 21, 1916 |
| 2,442,557 | Cox | June 1, 1948 |

FOREIGN PATENTS

| | | |
|---|---|---|
| 142,163 | Australia | July 11, 1951 |